Dec. 16, 1958  K. TOURÉ ET AL  2,864,236
METHOD OF AND MEANS FOR THE CONTROL OF THE AIR INLET
OPENING OF A JET PROPULSION UNIT
OR A GAS TURBINE ENGINE
Filed May 25, 1953  5 Sheets-Sheet 1
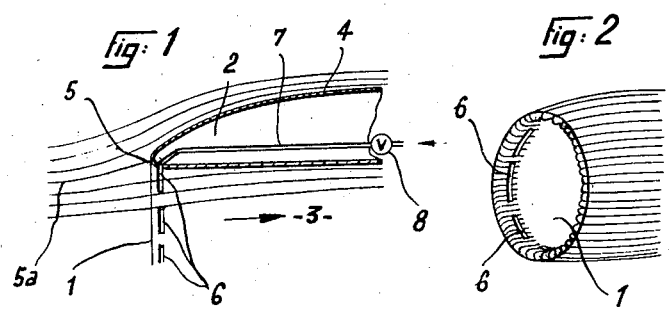
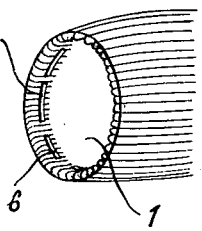
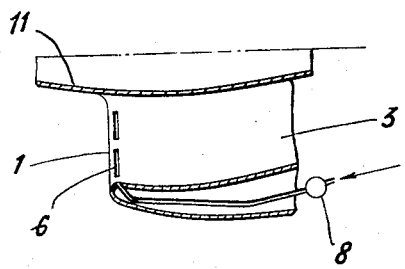
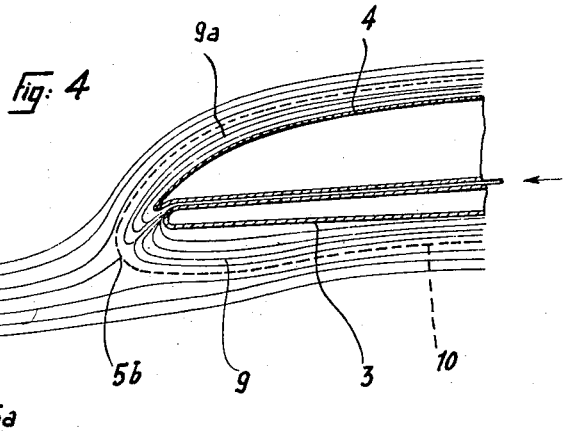
INVENTORS
Kleber Touré
Jean R. Lauzely
By Watson, Cole, Grindle & Watson
ATTORNEYS Dec. 16, 1958 K. TOURÉ ET AL 2,864,236
METHOD OF AND MEANS FOR THE CONTROL OF THE AIR INLET
OPENING OF A JET PROPULSION UNIT
OR A GAS TURBINE ENGINE
Filed May 25, 1953 5 Sheets-Sheet 2
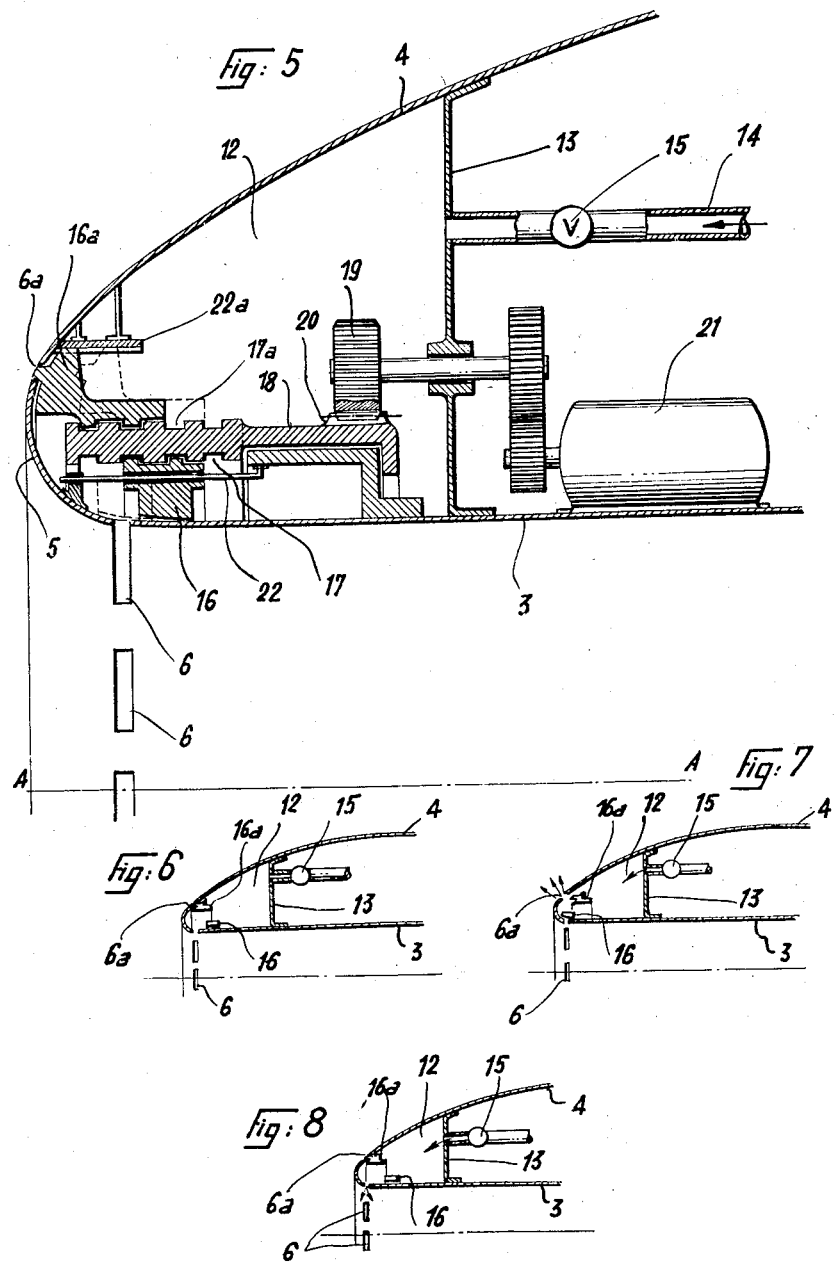
INVENTORS
Kleber Touré
Jean R. Lauzely
By Watson, Cole, Grindle &
Watson
ATTORNEYS

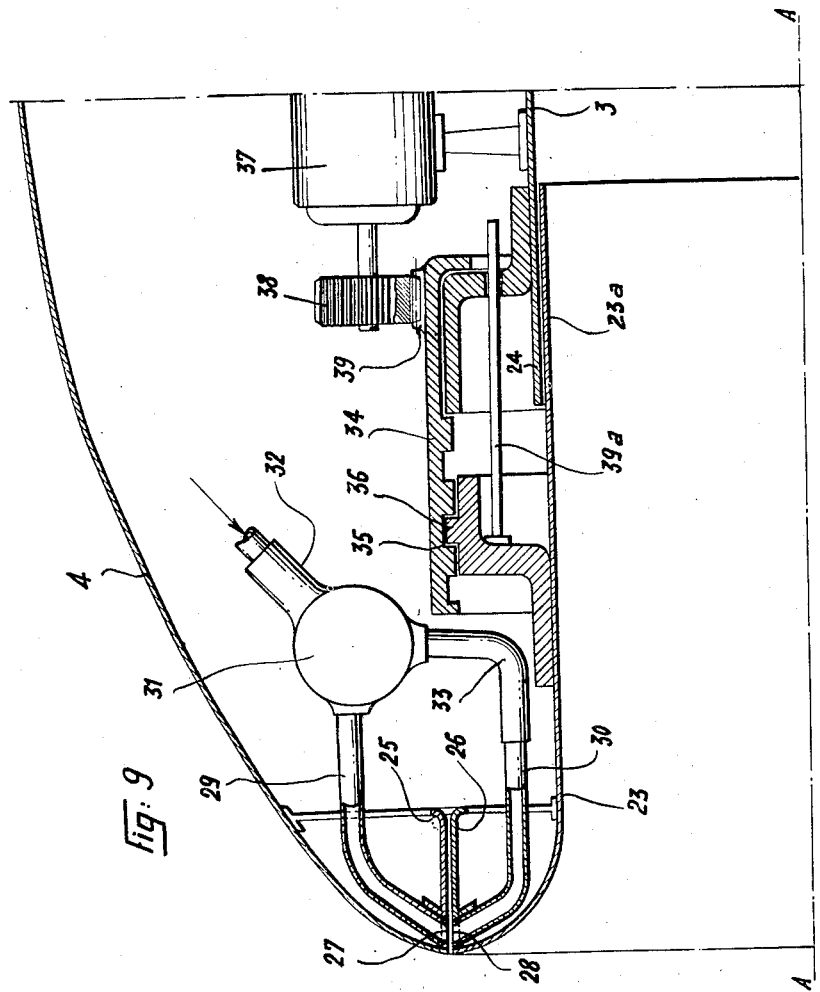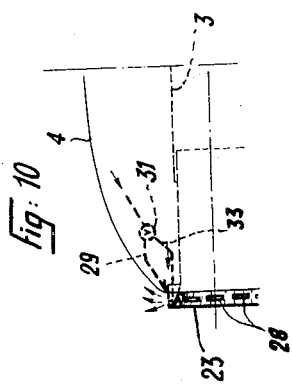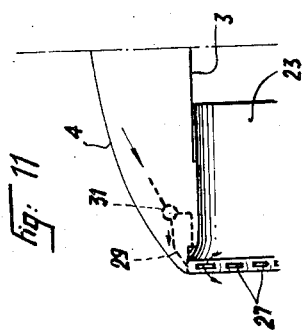

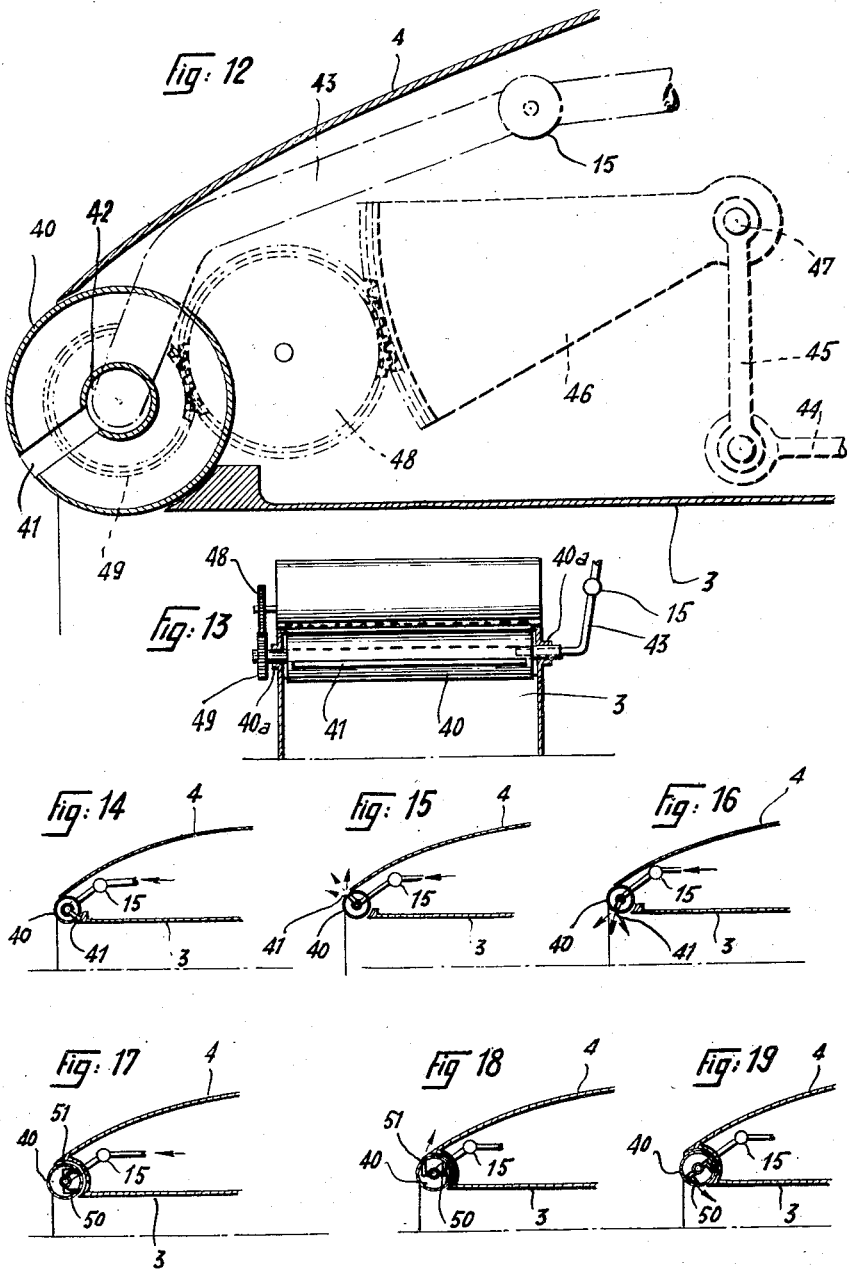

Dec. 16, 1958  K. TOURÉ ET AL  2,864,236
METHOD OF AND MEANS FOR THE CONTROL OF THE AIR INLET
OPENING OF A JET PROPULSION UNIT
OR A GAS TURBINE ENGINE
Filed May 25, 1953  5 Sheets-Sheet 5
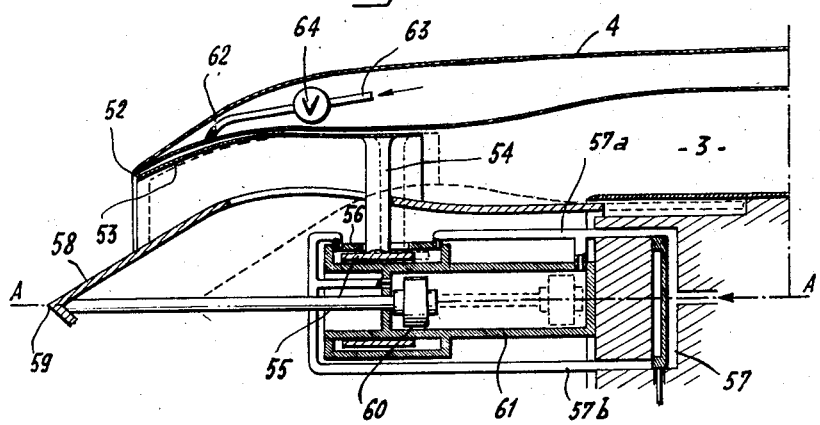
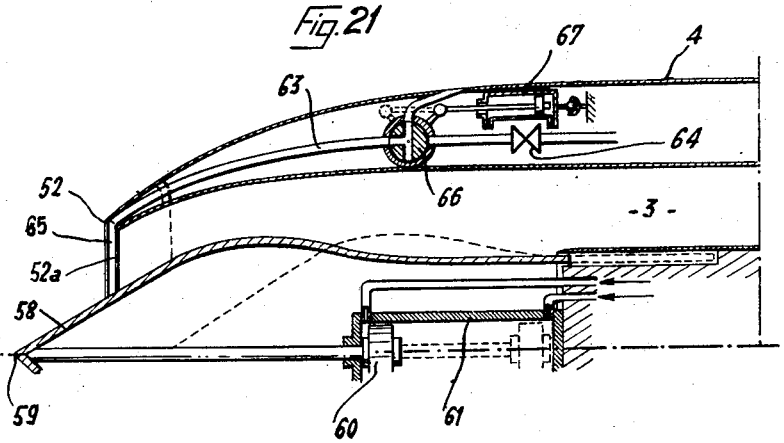
INVENTORS
Kleber Touré
Jean R. Lauzely
By Watson, Cole, Grindle & Watson
ATTORNEYS

United States Patent Office 2,864,236
Patented Dec. 16, 1958

2,864,236

METHOD OF AND MEANS FOR THE CONTROL OF THE AIR INLET OPENING OF A JET PROPULSION UNIT OR A GAS TURBINE ENGINE

Kléber Touré and Jean R. Lauzely, Paris, France, assignors to Societe Nationale d'Etude et de Construction de Moteurs d'Aviation, Paris, France, a French company Application May 25, 1953, Serial No. 357,332

Claims priority, application France June 5, 1952

7 Claims. (Cl. 60—35.6)

Many types of jet propulsion units are known at the present time, some of which consist of a mechanical compressor driven by a piston motor or a gas turbine whilst others, of the ram jet type, are not fitted with a compressor.

It is known that the air inlet opening of these jet propulsion units is designed to supply them with the quantity of air necessary to their optimum operation, that is to say corresponding to a minimum consumption of fuel per kilometre, and this over a field of operation which covers all flying conditions.

In order to achieve this, the air intake opening must ensure the maximum compensation for the dynamic pressure of flight and it must also increase as little as possible the overall drag of the aerodynamic structure.

An air inlet opening may be designed for a particular range of flight (subsonic or supersonic), but the characteristics of this opening only remain correct over a narrow field around the point of adaptation, and they become very bad for conditions of flight which differ widely from those considered. There is then observed both a loss of thrust and an increase in specific consumption.

Both the shape and the cross-section of the air opening must be varied if the optimum adaptation is to be obtained for every condition of flight and of operation on the engine.

In particular, it would be highly desirable to be able to control the shape of the air opening so that it is just as suitable for subsonic speeds as for supersonic speeds.

But, because of the various shapes of air openings which must be adopted in order to cover these two ranges, it is very difficult to obtain an air opening which can be varied by purely mechanical means.

The variation of an air inlet opening can also be useful in the case of units other than jet propulsion units, in particular in the case of gas turbine engines.

The object of the present invention is to provide a method of control of the air intake opening of a jet propulsion unit which enables the problem under consideration to be resolved without the necessity of having recourse to complicated mechanical arrangements.

In accordance with the invention, the modification of the shape of the profile and/or of the cross-section of the air inlet opening, is obtained by causing a jet of auxiliary fluid, at a higher pressure than the pressure of the entering air, to escape along the wall of the said opening through one or more suitably arranged orifices, in such a manner that the auxiliary fluid repels the entering fluid and interposes itself between this latter fluid and the wall of the intake opening, thus in effect replacing this wall by a fluid wall the shape of which may be modified by varying the delivery of the auxiliary fluid and/or by suitably choosing the orifices through which the injection is made.

The action of the auxiliary fluid may be combined with a displacement of certain parts of the air inlet orifice, which are made movable to this end, and in particular the displacement of a hub and/or of a portion of the internal wall of the inlet orifice.

The invention also covers the arrangements intended for putting this method into effect, which arrangements include one or more orifices or slots formed in the wall of the air intake opening, one or more pipes by which these orifices are supplied with fluid under pressure, means for controlling the amount of fluid delivered and, if need be, means for shutting off the said orifices.

In the case of a jet propulsion unit having a mechanical compressor, the auxiliary fluid under pressure may be derived with advantage from the delivery side of that compressor.

The orifices may be formed in the wall of the air intake opening in the vicinity of a line which is a line along which the flow is aerodynamically static for the speed of flight to which it is desired to adapt the intake opening, so that the auxiliary fluid, issuing through these orifices flows out in the same way as the flow of a source, that is to say without any particular impressed direction, and without being blown in the direction of the lines of flow terminating at the static aerodynamic line of the profile of the air intake opening.

In this way, the orifices may be arranged to give a blowing action approximately tangential to the wall of the intake opening, towards the interior or the exterior, or towards both.

Several series of slots or orifices having different shapes or positions or directions, may also be provided, each series being designed for a well-defined field of operation, the said series being selectively put into operation in accordance with the field over which the unit is working.

The description which follows below in connection with the attached drawings (which are given by way of example and not in any sense by way of limitation) will make it quite clear how the invention is to be carried into effect, the special features referred to, either in the text or in the drawings forming, naturally, a part of the said invention.

Fig. 1 is a view in axial half-section of a circular air intake opening of improved type in accordance with a first form of embodiment of the invention.

Fig. 2 is a diagrammatic view in perspective of this air intake.

Fig. 3 is a view in cross-section of a similar air intake arranged below a fuselage or a wing or across a fuselage.

Fig. 4 illustrates the method of action of the auxiliary jet passing through one of the slots shown in the preceding modes of embodiment.

Fig. 5 is an axial view in half cross-section of an air intake opening provided with another form of embodiment of the invention consisting of two series of slots combined with moving shutters.

Figs. 6 to 8 are diagrammatic views showing the arrangement of Fig. 5 in three different positions of operation.

Fig. 9 is an axial view in half cross-section of an air inlet opening provided with a third form of embodiment of the invention having tangential blowing slots or orifices.

Figs. 10 and 11 are diagrammatic views showing the arrangement of Fig. 9 in two different operating positions.

Fig. 12 is an axial view in half cross-section of an air intake opening provided with a fourth method of carrying out the invention.

Fig. 13 is a front view of the air intake opening.

Figs. 14 to 16 show the arrangement of Fig. 12 in three different operating conditions.

Figs. 17 to 19 are diagrammatic views showing an alternative to the arrangement of Fig. 12 in three positions of operation.

Fig. 20 is an axial half cross-section of an air intake opening provided with a fifth form of embodiment of the invention concerning the adaptation to subsonic speeds of an air inlet opening designed for a supersonic speed.

Fig. 21 is a cross-section of an alternative to this form of embodiment.

Figs. 1 and 2 show a frontal air intake opening at the front of the jet propulsion unit through an orifice 1 through which passes the air supplied to the jet unit. The fairing 3 which is supposed to be a body of revolution, encloses the wall of the intake channel 3 which follows after the orifice 1 and which terminates at the compressor of the jet unit (or at the combustion chamber in the case of a ram-jet unit). This fairing also comprises a profiled external surface 4 over which flows the atmospheric air which does not pass through the channel 3.

The channel 3 may be of the internal compression type, that is to say it may have a shape adapted for the transformation of the kinetic energy of the intake air into pressure energy.

With an air intake arranged in this way, the lines of flow are distributed as shown in Fig. 1 with a circular static line, shown with a reference No. 5 for the initial conditions of adaptation of the intake opening. When the speed of flight varies, this static line is generally displaced in the direction of the flow, towards the interior of the channel 3, in the case of higher speeds, and over the external surface 4 in the case of lower speeds.

In the form of embodiment now considered, a series of slots 6 shaped as circular arcs, are formed in the leading edge of the fairing, approximately at the place where the static line is located at the speed of flight for which it is desired to adapt the intake opening with the aid of the present arrangement, that is to say in the case now considered, for high speeds. These slots are furthermore, tangential to the surface formed by the lines of flow such as are shown at 5a and which end at the static line. The said slots may be made to communicate by one or more pipes 7 with a source of compressed air, for example with the delivery of the air compressor. One or more valves or taps such as 8 thus permit air to be supplied to these slots when it is so desired.

At low speeds of flight, the valves 8 are closed and the air intake then operates with the characteristics which are given to it by the external and internal profile of the fairing 2.

At high speeds of flight, the adaptation becomes very bad because of the local accelerations brought about by the fact that the line of flow 5a, which limits the volume of fluid pushed outside the channel 3, must pass around the leading edge, the radius of curvature of which is relatively small. In these conditions, the cross-section of the air intake should be smaller, and the fairing 2 should have a greater thickness and an increased radius of leading edge. The valves 8 are then opened so that the air coming from the compressor escapes through the slot 6. As these slots are close to the static line 5 and as they are, in addition, directed in the sense of the lines of flow 5a which end at this static line, the air passing through the slots divides into two parts, as shown by the lines 9 and 9a of Fig. 4, whilst flowing against the wall of the channel 3 and also against the external wall 4 of the fairing. This air thus interposes itself between the atmospheric air and the fairing and, as far as the flow of atmospheric air is concerned, everything takes place as if, in fact, the fairing had been deformed. For the solid wall of the fairing, there is substituted the external surface 10 of the auxiliary flow shown in dotted lines in Fig. 4. This fluid fairing adapts itself automatically to the conditions of operation under which it is formed. In particular, its leading edge is located in the immediate vicinity of the surface formed by the lines of flow, such as 5a which end at the static line, and the radius of curvature of this leading edge is increased. The local accelerations are in this way considerably reduced.

The static line 5 is appreciably displaced on the surface formed by the lines of flow 5a and is transferred to 5b. The effective cross-section of the intake, which was limited by the line 5, is now limited by the line 5b and is thus reduced—whilst at the same time it intercepts approximately the same tube of flow—and the effective thickness of the fairing is increased.

The internal shape of the channel 3 is also modified in such a way as to bring about the internal compression required by the new conditions of operation.

By varying the delivery of auxiliary fluid by opening the valves 8 to a greater or less extent, the effects referred to above may be correspondingly increased or reduced and, in consequence, the air intake opening may be adapted to the speed of flight in accordance with the variations of this speed.

The arrangement referred to above is, of course, applicable to intake openings other than those having shapes of revolution. Fig. 3 shows, for example, an intake channel 3, the frontal orifice 1 of which is placed underneath a wing or a fuselage 11 (Fig. 3 being in the latter case, a vertical cross-section) or laterally on a fuselage 11 (Fig. 3 being in that case a horizontal cross-section).

In the form of embodiment of Fig. 5, which is again concerned with an air intake opening of circular form, there are provided two series of blowing holes 6, 6a, which can be put into use independently of each other, the two series being arranged on each side of the static aerodynamic line 5 corresponding to an average speed of flight. The leading edge of the fairing is hollow and forms an air-tight chamber 12 closed by a partition 13, the said chamber being supplied with air under pressure, taken by example from the delivery side of the compressor of the jet unit by means of a piping system 14 and a valve or tap 15.

Each series of slots co-operates with an annular shutter 16, 16a, the axis of which coincides with the axis A—A of the air channel.

Each of these shutters may be given a translation movement parallel to the axis by means of helicoidal grooves 17, 17a, which are respectively formed in the interior and on the exterior of a ring 18 which is also a body of revolution around the axis A—A. Rotation of the ring about the said axis in order to effect movement of the shutters, is controlled by a pinion 19 engaging with a toothed portion of the said ring and moved, when required, by an electric motor in the opposite sense to its own rotation. The helicoidal grooves 17, 17a, have inversed threads so that for rotation of the ring 18 in a given direction, one of the shutters 16 for example, is moved to close the slots 6, whilst the other 16a moves in the opposite direction to open the slots 6a and vice-versa. The shutters 16 and 16a are, of course, combined with guides 22, 22a which prevent them from rotating with the ring 18.

The arrangement described above may be employed in the following manner:

Initial setting:
    Moderate flying speeds: Fig. 6—
        Slots 6a closed
        Slots 6 open
        Valve 15 closed
    Taking off: Fig. 7—
        Slots 6a open
        Slots 6 closed
        Valve 15 open
    High flying speeds: Fig. 8—
        Slots 6a closed
        Slots 6 open
        Valve 15 open It will thus be seen that on taking off, the auxiliary jet passing through the slots 6a has the effect of replacing the exterior rigid wall of the fairing by a fluid wall, the profile of which is adapted to very low speeds of flight.

In particular, the leading edge of this new profile has been moved to the immediate vicinity of the surface formed by the lines of flow which end at the static line, which has become extended as it has appreciably moved on this surface.

At moderate speeds of flight, the air intake opening is utilised with its material walls precisely designed for these speeds, whilst for high speeds of flight, the auxiliary jet issuing from the internal slots 6 carries out the adaptation which has already been described.

The method of embodiment of Fig. 9 utilises a tangential blast either towards the air intake channel or towards the external wall of the fairing. The external wall 4 of the fairing is fixed, while the forward part 23 of the internal wall, which terminates the air intake channel 3, is made up of a separate member of annular form which may be displaced in a direction parallel to the axis A—A of the intake opening, this member being movable to cover over a sufficient length at 23a, the rear part 24 of the wall of the channel 3. The mobile wall 23 is joined to the fixed external wall 4 at the leading edge of the fairing. These two walls are supported in addition, the one on the other, by two annular surfaces 25, 26, which are respectively fixed to each of the two walls. These surfaces 25, 26 are provided with slots 27, 28, which are distributed around the axis A—A and which are arranged opposite each other in the position of the members shown in Fig. 9. These slots are joined by tubular members 29, 30 to an annular distributor 31 which itself communicates with a source of compressed air through a tube 32. The tubes 30, forming part of the mobile portion 23 are provided with a flexible portion 33. A ring 34 is provided with a helicoidal groove 35 in which engages a finger 36 integral with the member 23. This ring may be rotated around the axis A—A by an auxiliary electric motor 37 which rotates it in the opposite directtion to its own rotation, through the medium of a pinion 38 engaging w.th a toothed portion 39 on the said ring. Guides such as are shown at 39a are, of course, provided in order to prevent the member 23 from rotating with the ring 34.

The position of the members shown in Fig. 9 corresponds to the initial conditions of the air intake opening for a moderate speed of flight. The slots 27, 28 being opposite each other, are mutually shut off and there is no blowing action towards the exterior of the compressed air from the distributor 31; in addition, the tube 32 may be provided with a valve which is closed for this case of operation, for greater security.

On taking off, the electric motor 37 is caused to rotate in the desired direction, which causes the member 23 to project towards the front (Fig. 10). Due to this movement, the slots 27 are shut off by the surface 26, whilst the slots 28, which are then uncovered, provide a jet approximately tangential to the external wall 4 of the fairing. The leading edge has its radius of curvature increased by this means, while at the same time it is displaced towards the exterior of the fairing 4, that is to say, the section delimited by the static line is increased. During flight at high speeds, the motor 37 is caused, on the other hand, to rotate in such a way that the member 23 withdraws itself slightly into the interior of the fairing (Fig. 11). The slots 28 thus remain shut off by the surface 25 but the slots 27, which remain uncovered blow out a jet which is approximately tangential towards the interior of the air intake channel 3, thus modifying the shape of the leading edge and reducing the effective cross-section of the air intake.

Fig. 12 shows a form of embodiment which is applicable to an air intake opening, the fairing of which has a leading edge forming a rectangular opening. This form of embodiment has the advantage that it enables the direction of the auxiliary blowing jet to be varied in accordance with requirements. The leading edge of the square intake is constituted by a cylinder 40 which can be rotated about two pivots 40a and has a longitudinal slot 41 which extends practically over the whole length of the said cylinder within a short distance from each of its extremities. The cylinder also has a central bore 42 which communicates with the slot 41 and which can be supplied with compressed air from a pipe 43 leading into the said bore through one of the pivots (or through both of them). The rotation of the cylinder about its pivots, by means of which the position of the slot 41 is varied, may be controlled by means of a crank 44 connected, for example, to the piston of a hydraulic motor, and a rod 45 fixed to a toothed segment 46 which pivots about an axis 47 and by gears 48, 49, of which the latter 49 is fixed to the cylinder.

The operation is as follows:

During flight at moderate speed, which corresponds to the normal conditions of adaptation, the valve 15 is closed and in addition the angular position of the cylinder is such that the slot 41 is covered, for example behind the wall of the channel 3 (Fig. 14).

On taking off, the cylinder is rotated by the control means described above, so that its slot is uncovered and directed towards the external wall 4 of the fairing (Fig. 15) and the valve 15, then being opened, the auxiliary jet acts in the same way as that passing through the slot 6a in the form of embodiment of Fig. 5.

During flight at high speed, the uncovered slot is turned towards the interior of the air intake channel (Fig. 16), and the valve being open, the auxiliary jet then acts in the same way as that which passes through the slots 6 in the case of Fig. 5.

This form of embodiment thus operates in the same way as that of Fig. 5 by the use of an auxiliary jet ejected near to the aerodynamic static line of the leading edge, which produces a total deformation both of the external wall of the fairing and also of the internal wall which forms the air intake channel. It presents, however, the advantage that the slot 41 may be given a whole series of intermediate positions between the two extreme positions which thus affords a great flexibility of control. The cylinder 40 may, of course, be provided with two or more slots.

The slots of the cylinder may also be formed in such a way as to provide a tangential jet towards the exterior or towards the interior as in the case of Fig. 9.

Figs. 17 to 19 show three positions of operation on an arrangement of this kind in which the cylinder 40 is provided with two slots 50, 51, which are not in the radial planes, so that these slots may be both shut off completely (Fig. 17), or one of the slots 51 may be uncovered in a position roughly parallel to the external wall of the fairing (Fig. 18), or the other slot 50 may be uncovered in a position roughly parallel to the wall of the air intake channel (Fig. 19).

Fig. 20 shows a form of embodiment which is particularly advantageous in adapting an air intake opening to either subsonic or supersonic ranges of speed of flight.

The initial profile of the air intake opening is that which corresponds to its adaptation to supersonic speed. The fairing comprises a sharp leading edge 52. Against the internal wall of the fairing, there is applied a thin wall 53 which surrounds the air intake channel and which is arranged so as to move longitudinally along the axis A—A of the intake opening. This wall 53 is supported, to this end, by radial arms 54 which are secured to an annular piston 55 moving in an annular cylinder 56 which may be supplied at either one or the other of its extremities with oil under pressure derived from a distributor 57.

In the axis A—A there is arranged a moving cone 58 terminating in a point 59 which projects forward outside the air intake opening and creates an external compression with an oblique shock wave in the case of supersonic flight. This cone 58 is controlled by a piston 60 moving in a cylinder 61 which receives oil under pressure at either the one or the other of its ends at the same time as the annular cylinder 56 from the distributor 57. The fixed internal wall of the fairing under the mobile wall 53 is provided with slots or orifices 62 around its circumference, which slots may be supplied with compressed air from the delivery of the air compressor through a piping system 63 and a valve 64.

During supersonic flight, the position of the members is that shown in full lines on Fig. 20, the cylinders 56 and 61 being supplied with oil under pressure at 57a, the valve 64 being closed and the moving wall 53 being in close contact with the internal wall of the fairing.

When the speed of flight is reduced, the adaptation of the air intake opening is effected by supplying, at 57b, the left-hand ends of the cylinders 56 and 61 so as to move the mobile wall 53 and the cone 58 towards the right-hand side of the drawing, that is to say towards the position of the members, as shown in dotted lines. At the same time, the valve 64 is opened so that the compressed air, flowing out of the slots 62, is finally ejected near to the leading edge of the fairing through the open slot between the sharp edge 52 and the edge of the mobile wall 53.

The alternative shown in Fig. 21 differs from the preceding form of embodiment in that the mobile wall 53 is dispensed with, the fairing comprising two sharp concentric leading edges 52 and 52a, forming between them an annular slot 65 which may be supplied for subsonic flight by the piping system 63 and the valve 64. In order that this annular slot, which is constantly open, shall not cause too much interference during supersonic flight, it may be made to communicate with the exterior of the fairing at a point at which the air pressure is suitable by means of a three-way valve 66, the spigot of which is operated by a hydraulic motor 67.

It will be clearly understood that other forms of embodiment may be applied to the method and to the arrangements which have been described above, in particular by the use of equivalent technical means, without thereby departing from the scope or from the spirit of the present invention.

What we claim is:

1. In a jet propulsion unit designed for supersonic speeds and having an air intake casing ending forwardly with a sharp leading edge, a device for controlling the flow of atmospheric air into said casing by modifying the effective leading edge, comprising controllable nozzle means opening at said leading edge and facing forwardly of said unit, and means for supplying pressure fluid to said nozzle means, whereby a fluid jet is projected by said nozzle means forwardly of said unit and outside said casing to form a continuous fluid wall around and forwardly of said sharp leading edge.

2. Device as claimed in claim 1, further comprising an axially slidable bullet ending with an acute frontal point, within said air intake casing, and control means for adjusting said bullet in a forwardly protruding position when the nozzle means is not supplied with pressure fluid, and in a retracted position when the nozzle means is supplied with pressure fluid.

3. Device as claimed in claim 2, wherein the bullet control means and the fluid supply control means are synchronously actuated.

4. Device as claimed in claim 1, wherein the nozzle means is in the form of a slot-like passage extending peripherally of the air intake casing and bounded by two walls.

5. Device as claimed in claim 4, wherein one of the walls is movable relatively to the other to vary the flow area of the pressure fluid.

6. Device as claimed in claim 1, wherein the air intake casing has an outer surface in contact with ambient air, said device comprising passage means opening out on said outer surface, and valve means for selectively connecting the nozzle means with said passage means and with the pressure fluid supply means.

7. In a jet propulsion unit having an air intake casing ending forwardly with a leading edge, a device for controlling the flow of atmospheric air into said casing by modifying the effective leading edge thereof, comprising controllable nozzle means opening at said leading edge, facing forwardly of said unit and orientable in a continuous manner between two extreme positions, and means for supplying pressure fluid to said nozzle means, whereby a fluid jet is projected by said nozzle means forwardly of said unit and outside said casing to form a continuous fluid wall around and forwardly of said leading edge.

References Cited in the file of this patent

UNITED STATES PATENTS

| | | |
|---|---|---|
| 2,404,275 | Clark et al. | July 16, 1946 |
| 2,594,118 | Boyd | Apr. 22, 1952 |
| 2,632,295 | Price | Mar. 24, 1953 |

FOREIGN PATENTS

| | | |
|---|---|---|
| 461,652 | Germany | June 25, 1928 |
| 635,270 | Great Britain | Apr. 5, 1950 |
| 637,512 | Great Britain | May 24, 1950 |
| 662,426 | Germany | Nov. 24, 1934 |